United States Patent [19]

Passereau

[11] 4,191,474

[45] * Mar. 4, 1980

[54] SPECTROGRAPH FOR AN EXTENDED SPECTRAL FIELD IN WHICH PARTIAL PLANAR DIFFRACTION SPECTRA ARE SUCCESSIVELY FORMED IN THE SAME PLANE

[75] Inventor: Geneviève Passereau, Bourg la Reine, France

[73] Assignee: Instruments S.A., Paris, France

[*] Notice: The portion of the term of this patent subsequent to May 2, 1995, has been disclaimed.

[21] Appl. No.: 920,995

[22] Filed: Jun. 30, 1978

[30] Foreign Application Priority Data

Jul. 8, 1977 [FR] France .................. 77 21098

[51] Int. Cl.² ........................... G01J 3/18
[52] U.S. Cl. ................... 356/305; 350/3.70; 350/162 R
[58] Field of Search ............ 356/305, 334, 332; 350/162 R

[56] References Cited

U.S. PATENT DOCUMENTS

| 3,011,391 | 12/1961 | Fastie ..................... 356/305 |
| 4,087,183 | 5/1978 | Passereau ................ 356/305 |

*Primary Examiner*—F. L. Evans
*Attorney, Agent, or Firm*—Haseltine, Lake & Waters

[57] ABSTRACT

A spectrograph for an extended spectral field having an inlet slot for defining a source of light to be analyzed and a dispersive system constituted by a concave holographic grating which has recording points with coordinates in relation with the coordinates of the light source to be analyzed to produce for each of respective bands of wavelengths, which in total cover the entire range of wavelengths of the spectral field to be analyzed, tangential focal lines for different wavelengths which are disposed in the same plane. The concave holographic grating is rotatable around an axis passing through the center of the grating and perpendicular to a plane passing through the center of the inlet slot so that the respective partial plane diffraction spectra are successively formed in the same plane when rotating the grating around its axis.

1 Claim, 3 Drawing Figures

SPECTROGRAPH FOR AN EXTENDED SPECTRAL FIELD IN WHICH PARTIAL PLANAR DIFFRACTION SPECTRA ARE SUCCESSIVELY FORMED IN THE SAME PLANE

FIELD OF THE INVENTION

The present invention relates to improvements in a spectrograph for an extended spectral field and particularly to improvements in the construction shown in U.S. Pat. No. 4,087,183.

PRIOR ART

U.S. Pat. No. 4,087,183 discloses a spectrograph in which the dispersive system of a beam of complex incident light passing through an inlet slot is solely constituted by a concave holographic grating and this spectrograph is characterized by the fact that the dispersion spectrum is formed on a planar surface for an extended spectral region of the order, for example, of 2,000 to 8,000 Å in the visible spectrum of 200 to 800 Å in the ultraviolet region.

However, two different factors act to limit the capabilities of such apparatus. Firstly, there is a limit to the amplitude of the spectrum as beyond a certain amplitude it becomes practically impossible to construct a grating capable of forming a planar spectrum with satisfactory resolution.

U.S. Pat. No. 4,087,183 discloses a first solution to this problem by utilizing, at least, two gratings on a common support of each of which gratings produces a planar spectrum offset with respect to the other and each occupying a sole portion of the extended spectral field. However, the formation of a number of gratings on the same support poses various technological problems.

Furthermore, the detectors such as a combination of photodiodes or vidicon tubes are of small size so that in order to analyze a spectral field of large size, it is necessary to employ a plurality of costly detectors or to mount them on a movable member which allows them to be displaced over the spectral field.

SUMMARY OF THE INVENTION

An object of the present invention is to provide a spectograph which will permit the use of a single fixed planar detector in which various portions of the entire diffraction spectrum will be successively formed on the same portion of the plane of the detector.

The invention particularly contemplates a spectrograph for an extended spectral field comprising a source of light to be analyzed and an optical system constituted solely by a concave holographic grating whose diffraction spectrum is formed on a planar surface. According to the invention, the different portions of the diffraction spectrum are seccessively formed on the same planar surface when the grating is turned around an axis passing through the center of the grating and perpendicular to the diametral plane containing the center of the inlet slot.

The invention will become better understood with reference to an embodiment of the invention and also, by way of example, with reference to the general nature of calculations for determining the features of the utilized grating.

DETAILED DESCRIPTION

Figure 1:
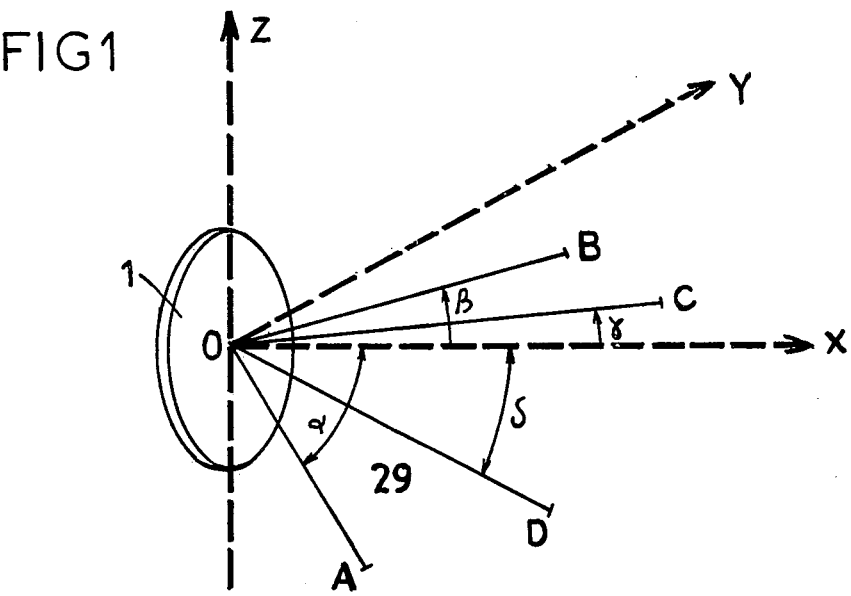
FIGS. 1 and 2 are diagrammatical illustrations defining the coordinates and dimensional notation utilized in the calculations for defining the grating.

It is known that to form a holographic grating on a supporting surface, an interference system is established between two light-beams proceeding from two coherent sources; the equiphase line constituted by the intersection of the interference surfaces with the supporting surface determine the lines of the grating, after selective solution of a photopolymerizable resin previously deposited on the support. Referring to FIG. 1, a holographic grating of this kind has been registered on a concave spherical surface 1, starting from point sources C and D the polar coordinates of which in the plane XOY are respectively $1_C \gamma$ and $1_D \delta$ and emit on the registration wavelength $\lambda_o$. In the employment of the grating as a spectrograph the source to be analyzed is placed at the point A of coordinates $1_A \alpha$, and for each wavelength $\lambda$ an image is formed at B ($1_B \beta$). B is the perfect image of A if the optical path MA+MB remains constant whatever the coordinates XYZ of the point M on the grating, or more precisely along a groove in the grating, this optical path varying by $k\lambda$ from one groove to the other, k being the spectral order.

In general, aberrations persist which are characterized by the optical path having an aberration of $\Delta$ which it is known can, for concave holographic gratings, be put in the following form where P is a constant:

$$\Delta = MA + MB - \frac{k\lambda}{\lambda_o}(MC - MD) - P$$

For a spherical concave grating of radius R it has been established that the optical path having an aberration of $\Delta$ could be put in the following form:

$$\Delta = -Y\left(H - \frac{k\lambda}{\lambda_o}H'\right) + \frac{Y^2}{2}\left(T - \frac{k\lambda}{\lambda_o}T'\right) + \frac{Z^2}{2}\left(A - \frac{k\lambda}{\lambda_o}A'\right) + \frac{Y^3}{2}\left(C_1 - \frac{k\lambda}{\lambda_o}C_1'\right) + \frac{YZ^2}{2}\left(C_2 - \frac{k\lambda}{\lambda_o}C_2'\right) + \ldots \quad (1)$$

in which $$H = \sin\alpha + \sin\beta; \quad H' = \sin\gamma - \sin\delta$$

$$T = \frac{\cos^2\alpha}{1_A} - \frac{\cos\alpha}{R} + \frac{\cos^2\beta}{1_B} - \frac{\cos\beta}{R}; \quad T' = \frac{\cos^2\gamma}{1_C} - \frac{\cos\gamma}{R} - \left(\frac{\cos^2\delta}{1_D} - \frac{\cos\delta}{R}\right)$$

$$A = \frac{1}{1_A} - \frac{\cos\alpha}{R} + \frac{1}{1_B} - \frac{\cos\beta}{R}; \quad A' = \frac{1}{1_C} - \frac{\cos\gamma}{R} - \left(\frac{1}{1_D} - \frac{\cos\delta}{R}\right)$$

$$C_1 = \frac{\sin\alpha}{1_A}\left(\frac{\cos^2\alpha}{1_A} - \frac{\cos\alpha}{R}\right) + \frac{\sin\beta}{1_B}\left(\frac{\cos^2\beta}{1_B} - \frac{\cos\beta}{R}\right); \quad C_1' = \frac{\sin\gamma}{1_C}\left(\frac{\cos^2\gamma}{C} - \frac{\cos\gamma}{R}\right) - \frac{\sin\delta}{1_D}\left(\frac{\cos^2\delta}{1_D} - \frac{\cos\delta}{R}\right)$$

-continued $$C_2 = \frac{\sin\alpha}{1_A}\left(\frac{1}{1_A} - \frac{\cos\alpha}{R}\right) + \frac{\sin\beta}{1_B}\left(\frac{1}{1_B} - \frac{\cos\beta}{R}\right); C_2' = \frac{\sin\gamma}{1_C}\left(\frac{1}{1_C} - \frac{\cos\gamma}{R}\right) - \frac{\sin\delta}{1_D}\left(\frac{1}{1_D} - \frac{\cos\delta}{R}\right)$$

In this expression (1) $\sin\alpha + \sin\beta = kN\lambda$ because A and B are conjugate object-image points, the grating having N lines per unit of length for a wavelength $\lambda$; similarly $\sin\gamma - \sin\delta = kN\lambda_o$ because C and D are the point sources of the registration beams of the grating.

In this expression (1) T and T' characterize defocusing, A and A' the astigmatism, $C_1$ and $C_1'$ the first order coma, $C_2$ and $C_2'$ the second order coma. The next terms in the development of $\Delta$ as a series refer to spherical aberrations which will not be considered here. It will be observed that the terms T, A, $C_1$ and $C_2$ depend only upon the coordinates of the points A and B in use, whilst the terms T', A', $C_1'$ and $C_2'$ depend only upon the coordinates of the points C and D of registration of the grating.

For determination of the characteristics of the grating the line density N of the grating will be determined a priori, and the registration wavelength $\lambda_o$ as well as the spectral field to be covered, $\lambda_1$ to $\lambda_3$.

Figure 2:
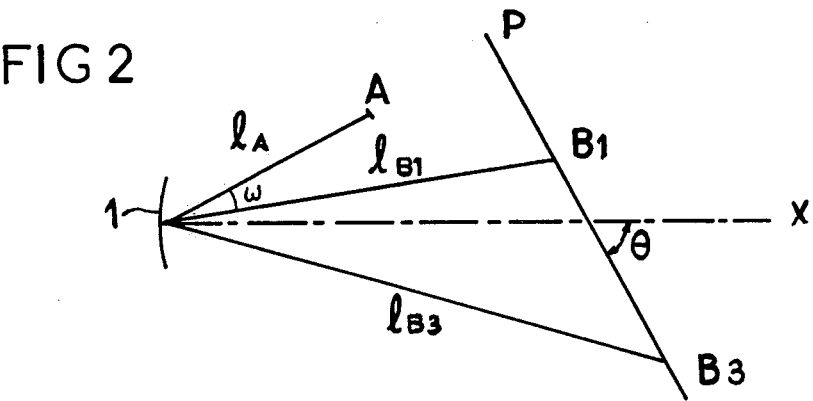

Referring to FIG. 2 the angle of defection $\omega$ of the wavelength $\lambda_1$ with respect to the incident beam is a priori determined, as well as the inclination $\theta$ of the plane of the spectrum with respect to the normal to the grating, the plane being represented here by its line of intersection P with the plane XOY.

By definition the spectrum that is observed is the locus of the tangential focal lines and for a wavelength $\lambda$ the position of the tangential focal line is determined when the term $T - (k\lambda/\lambda_o)T'$ vanishes in the expression (1). For the spectrum to be plane the tangential focal lines corresponding with all the wavelengths must be in one and the same plane. In practice it is expressed that the tangential focal lines of three wavelengths $\lambda_1 \lambda_2 \lambda_3$ in the field being considered are in one and the same plane, or that their points of intersection with the plane XOY are at the same point P; the tangential focal lines for the other wavelengths are not in this plane but their distances from this plane are sufficiently small, taking into account the aperture of the spectrograph (the dimensions of the grating with respect to the distance $1_B$), for the spread of the spectral rays to be small, that is to say, for the resolution to be acceptable. For $\lambda_1$ and $\lambda_3$ are taken the extreme wavelengths of the spectral field, or values near the extremes, and for $\lambda_2$ an intermediate value.

In a first part of the calculation particular attention is first paid to the configuration of the points of use A and $B_1, B_2, B_3$ corresponding with $\lambda_1 \lambda_2 \lambda_3$ and assuming the registration data is known. Under these conditions T' is a constant and for each wavelength retained the vanishing of the defocusing term may be written $T = (k\lambda/\lambda_o)T'$ for each wavelength, or:

$$\frac{\cos^2\alpha}{1_A} - \frac{\cos\alpha}{R} + \frac{\cos^2\beta_1}{1_{D1}} - \frac{\cos\beta_1}{R} = \frac{k\lambda_1}{\lambda_o}T \text{ with;}$$
$$\sin\alpha + \sin\beta_1 = kN\lambda_1$$
$$\frac{\cos^2\alpha}{1_A} - \frac{\cos\alpha}{R} + \frac{\cos^2\beta_1}{1_{D2}} - \frac{\cos\beta_2}{R} = \frac{k\lambda_2}{\lambda_o}T \text{ with;}$$
$$\sin\alpha + \sin\beta_2 = kN\lambda_2$$
$$\frac{\cos^2\alpha}{1_A} - \frac{\cos\alpha}{R} + \frac{\cos^2\beta_3}{1_{D3}} - \frac{\cos\beta_3}{R} = \frac{k\lambda_3}{\lambda_o}T \text{ with;}$$
$$\sin\alpha + \sin\beta_3 = kN\lambda_3$$

To these equations is added another relationship between $\alpha$ and $\beta_1$ since $\omega$ is fixed. Thus one can determine the angle $\alpha$ and the three angles $\beta_1 \beta_2 \beta_3$ corresponding to the three reference wavelengths. By writing in addition that the three tangential focal lines are at one and the same point forming the angle $\theta$ with the normal to the grating one obtains a system of equations which, by letting $\theta$ vary, enable a satisfactory group of values $1_A$, $1_B$, $1_{B2}$, $1_{B3}$ to be found.

Of course these calculations are processed in a computer, setting up of the programmes for processing these equations being within the capacity of specialists in this domain.

In a second phase one calculates the defocusing for intermediate wavelengths other than the three reference wavelengths, that is to say, the deviations of the tangential focal lines of these other wavelengths with respect to the plane retained, and the aggregate of these deviations is minimized by operating again on the angles $\theta$ and $\omega$. Thus one then has available a new group of compatible values of $\omega$, $\theta$, $1_A$ and $\alpha$, $1_{B1}$ and $\beta_1$, $1_{B2}$ and $\beta_2$, $1_{B3}$ and $\beta_3$ which determine the value of T' and thereby a relationship between the coordinates of the registration points.

In a third phase of calculation one pays particular attention to the correction of first order coma, the term characteristic of which in the expression (1) is $$C_1 - \frac{k\lambda}{\lambda_o}C_1', \text{ or}$$

$$\frac{\sin\alpha}{1_A}\left(\frac{\cos^2\alpha}{1_A} - \frac{\cos\alpha}{R}\right) + \frac{\sin\beta}{1_A}\left(\frac{\cos^2\beta}{1_A} - \frac{\cos\beta}{R}\right) - \frac{k\lambda}{\lambda_o}C_1',$$

by trying to make this term proportional to the wavelength and acting upon the angle of aperture $\omega$. This makes the defocusing vary and compels one to readjust the inclination $\theta$, which in general brings about a deterioration in the linearity of the coma. Hence, one is compelled to readjust the angle $\omega$ and the inclination $\theta$ in succession until both acceptable defocusing and linear variation of the coma with the wavelength are obtained.

There is then available another group of values of $\omega$ and $\theta$ and of coordinates of the points $AB_1B_2B_3$ for the three wavelengths retained, and of the two corresponding values T' and C', hence of two relationships between the coordinates of the registration points.

Finally in a fourth phase one may try to annul the astigmatism for an intermediate wavelength $\lambda_4$ chosen so as to balance out the remainders over the whole of the spectrum. This requires the solution of the equation $A - k(\lambda_4/\lambda_o)A' = 0$ which gives a value A' for determining a new relationship between the coordinates of the registration points.

From the values T', A' and $C_1'$ and the relationship $\sin\gamma - \sin\delta = kN\lambda_o$ one can obtain the coordinates $(1_C\gamma)$ and $(1_D\delta)$ of the registration points of the grating.

According to the present invention the total spectrum is divided into a plurality of greatly reduced bands and the calculations which have been shown above are used for each of the bands while imposing the supplementary requirement that the values $1_{B1}$ and $1_{B3}$ are respectively equal for all of the partial bands. This will lead to a successive correction of the fixed values proceeding from the angle of deviation of the minimum wavelength of each band or the angle of inclination of the spectral plane with respect to the perpendicular to the grating. This can also lead to modification of the amplitude of the partial bands.

EXAMPLE

Figure 3:
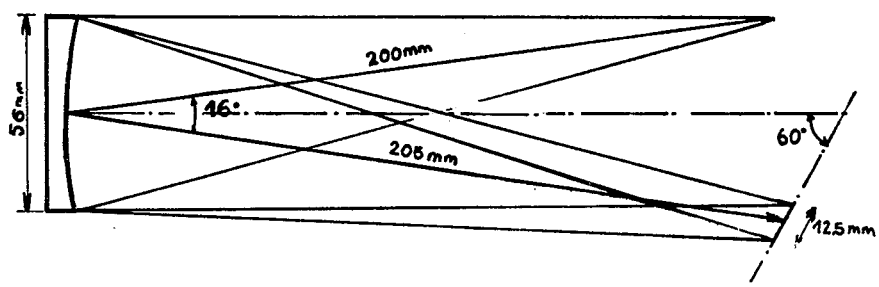
FIG. 3 diagrammatically illustrates a particular embodiment of the invention.

This example will be given in connection with FIG. 3 for a spectral region from 2,000–8,000 Å. The coordinates of the holographic grating are determined for partial bands of 2,000 Å by utilizing two light sources of wavelength of 4,880 Å. The grating has a diameter of 56 mm with 300 lines per millimeter. With a point source situated at 200 mm from the center of the network there is obtained a portion of the sprectral plane of 12.5 mm length at a distance of 205 mm, the plane of the spectrum forming an angle of about 60° with respect to the perpendicular to the grating.

The portion of the planar spectrum of 12.5 mm covers a field of about 2,000 Å and the totality of the spectrum of 2,000–8,000 Å is successively formed on this plane by simple rotation of the grating around the axis passing through the center of the network and perpendicular to the diametral plane containing the center of the inlet slot. The resolution is of the order of 5 Å.

The apparatus thus constructed has clear analogy to a monochromator having simple rotation of the grating since it permits, by simple rotation of the grating, passage on the same planar surface of the entire spectral field under consideration. However, for each position this is no longer a single beam which is focused on an output slot, but a spectrum of much greater extent is recorded on a planar surface.

Obviously, the apparatus can also be utilized as a monochromator by disposing an output slot in the center of the plane of the spectrum. It can also serve both usages, for example, by utilizing a planar displaceable reflection mirror to send the diffraction beam either to the planar detector for use in a spectrograph or through an output slot an image in the mirror of the center of the detector for use in a monochromator.

It is further noted that the invention can also be employed in spectrographs or monochromators operating with incident rays with a grating on a toroidal support to determine the conditions of formation of a fixed planar spectrum or for forming on a planar surface by rotation of the grating. One would transpose then the expression of the terms of formula 1 above according to the indications given in U.S. Pat. No. 4,063,818 at column 3, lines 12–35.

What is claimed is:

1. A spectrograph for an extended spectral field, including an inlet slot for defining a source of light to be analyzed, and a dispersive system consisting solely of a concave holographic grating, said grating having registration points with coordinates in relation with the coordinates of the light source to be analyzed to produce, for each of respective different bands of wavelengths which in total cover the entire range of wavelengths of the spectral field to be analyzed, tangential focal lines for different wavelengths which are disposed in the same plane, said grating being rotatable around an axis passing through the center of the grating and perpendicular to a plane passing through the center of the inlet slot whereby respective partial planar diffraction spectra are successively formed in the same plane when rotating the grating around said axis.

* * * * *